United States Patent
Kang et al.

(10) Patent No.: US 8,046,398 B2
(45) Date of Patent: Oct. 25, 2011

(54) METHOD AND APPARATUS FOR MODULATING SYMBOLS IN AN ORTHOGONAL FREQUENCY DIVISION MULTIPLEXING SYSTEM AND TRANSMISSION APPARATUS USING THE SAME

(75) Inventors: Jun-Kyu Kang, Seoul (KR); Young-Ik Cho, Seoul (KR); Hun-Kee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 969 days.

(21) Appl. No.: 11/966,249

(22) Filed: Dec. 28, 2007

(65) Prior Publication Data

US 2008/0165676 A1     Jul. 10, 2008

(30) Foreign Application Priority Data

Dec. 28, 2006   (KR) .......................... 10-2006-0137082

(51) Int. Cl.
*G06F 15/00* (2006.01)

(52) U.S. Cl. ..................................................... 708/404

(58) Field of Classification Search .................. None
See application file for complete search history.

(56) References Cited

U.S. PATENT DOCUMENTS

| | | | | |
|---|---|---|---|---|
| 7,224,725 B2 * | 5/2007 | Kim | .............................. | 375/232 |
| 7,543,009 B2 * | 6/2009 | Pisoni | .......................... | 708/403 |
| 2003/0081763 A1 * | 5/2003 | Tang et al. | ............... | 379/406.01 |
| 2005/0047325 A1 | 3/2005 | Singh et al. | | |

FOREIGN PATENT DOCUMENTS

| | | |
|---|---|---|
| KR | 1020010048447 | 6/2001 |
| KR | 1020030092704 | 12/2003 |
| KR | 1020050120964 | 12/2005 |

* cited by examiner

*Primary Examiner* — Tan V Mai
(74) *Attorney, Agent, or Firm* — The Farrell Law Firm, P.C.

(57) ABSTRACT

A method for modulating a symbol in a transmitter of an Orthogonal Frequency Division Multiplexing (OFDM) system. The symbol modulation method includes multiplying an input stream of an Inverse Fast Fourier Transform (IFFT) unit by a Twiddling factor for circular-shifting the input stream of the IFFT unit by a Cyclic Prefix (CP) length; performing IFFT on the input stream of the IFFT unit, which is multiplied by the Twiddling factor; buffering data corresponding to the CP length beginning from a front of an output stream of the IFFT unit; and generating an OFDM symbol by forward-copying the buffered data to a back of the output stream of the IFFT unit.

14 Claims, 13 Drawing Sheets

METHOD AND APPARATUS FOR MODULATING SYMBOLS IN AN ORTHOGONAL FREQUENCY DIVISION MULTIPLEXING SYSTEM AND TRANSMISSION APPARATUS USING THE SAME

PRIORITY

This application claims priority under 35 U.S.C. §119(a) to a Korean Patent Application filed in the Korean Intellectual Property Office on Dec. 28, 2006 and assigned Ser. No. 2006-137082, the disclosure of which is incorporated herein by reference.

BACKGROUND OF THE INVENTION

1. Field of the Invention

The present invention relates generally to a method and apparatus for modulating symbols in a wireless communication system, and in particular, to a method and apparatus for efficiently modulating symbols in an Orthogonal Frequency Division Multiplexing (OFDM) system, and a transmitter using the same.

2. Description of the Related Art

With the ongoing development of the communication industry and the increasing user demands for packet services, there is an increasing need for communication systems that are capable of efficiently providing the packet services. The conventional communication networks, as they have been developed to mainly provide voice services, have narrower data transmission bandwidths and higher service charges. To solve these problems, extensive research is being conducted on Orthogonal Frequency Division Multiplexing (OFDM), which is the typical example of the broadband packet transmission scheme.

OFDM, the typical multi-carrier transmission scheme of overlapping multiple orthogonal subcarriers, converts a serial input symbol stream into parallel streams and modulates each of the parallel streams with multiple orthogonal subcarriers before transmission. It is known that the OFDM scheme can provide an efficient platform for high-speed data transmission using its robustness against multipath fading.

The Orthogonal Frequency Division Multiple Access (OFDMA) system recently attracting public attention, which is an OFDM-based multiple access system, divides the frequency domain into subchannels each having a plurality of subcarriers, and allocates the subchannels to the users individually to perform resource allocation taking both the time and frequency domains into account, thereby accommodating multiple users with the limited frequency resources. Herein, the use of the term "OFDM system" will be construed to include the OFDMA system.

The OFDM scheme, as it divides an input data stream into $N_S$ subcarriers before transmission, can reduce $N_S$ times the relative multipath spread for the symbol period by increasing the symbol interval $N_S$ times. Because transmission of the OFDM symbols is processed on a block-by-block basis, while the OFDM symbols are transmitted over multiple paths, the currently transmitted OFDM symbol may receive interference from the previously transmitted OFDM symbol. As is well known, a scheme for inserting a guard interval between consecutive blocks is used to efficiently cancel the inter-OFDM symbol interference, or Inter-Symbol Interference (ISI). The guard interval is selected to be longer than the expected delay spread so that the multipath component from a previous OFDM symbol will not interfere with a current OFDM symbol.

For the OFDM symbols, a Cyclic Prefix (CP) insertion scheme for copying a partial interval of an OFDM symbol and cyclically-concatenating the copy to the guard interval is used to prevent Inter-Channel Interference (ICI). The 'CP insertion' refers to an operation of copying a block of, for example, a length $N_{CP}$ at the back of an OFDM symbol and filling the guard interval with the copied block. Even though a subcarrier delay occurs by the CP insertion, an integer period is maintained in a Fast Fourier Transform (FFT) interval, guaranteeing the orthogonality, and only a phase rotation caused by the delay occurs, making it possible to prevent the ICI.

In the OFDM system, a symbol modulation scheme parallel-converts serial input data into a number of parallel data streams equal to the number of subcarriers, and modulates each of the parallel-converted data streams with its associated subcarrier. Subcarrier modulation/demodulation can be realized by Discrete Fourier Transform (DFT) and Inverse Discrete Fourier Transform (IDFT). Because the DFT and IDFT have the higher hardware complexity and the higher calculation, they can be realized using Fast Fourier Transform (FFT) and Inverse Fast Fourier Transform (IFFT) algorithms, respectively, to perform the high-speed operation while reducing the complexity and the calculation.

The CP insertion is performed in a symbol modulation process of the OFDM system, and for the CP insertion, an output of IFFT is stored in a buffer of a transmitter. In this way, for the CP insertion, the modulation process of the OFDM symbol should store the IFFT output in the buffer until the samples disposed at the back of the IFFT output are output, inevitably causing a delay. In addition, for hardware, there is a need for a buffer for storing all the output of the IFFT. Therefore, a reduction in the delay and the required buffer capacity (or required buffer size), if possible, can improve performance of the transmitter in the OFDM system. That is, for the performance improvement of the transmitter in the OFDM system, there is a need for an apparatus and method capable of reducing the delay and the required buffer capacity.

SUMMARY OF THE INVENTION

An aspect of the present invention is to address at least the problems and/or disadvantages described herein and to provide at least the advantages described below. Accordingly, an aspect of the present invention is to provide a symbol modulation method and apparatus capable of reducing the delay occurring in a transmitter of an OFDM system, and a transmitter using the same.

Another aspect of the present invention is to provide a symbol modulation method and apparatus capable of reducing the buffer size required in a transmitter of an OFDM system, and a transmitter using the same.

According to one aspect of the present invention, there is provided a method for modulating a symbol in a transmitter of an Orthogonal Frequency Division Multiplexing (OFDM) system. The symbol modulation method includes multiplying an input stream of an Inverse Fast Fourier Transform (IFFT) unit by a Twiddling factor for circular-shifting the input stream of the IFFT unit by a Cyclic Prefix (CP) length; performing IFFT on the input stream of the IFFT unit, which is multiplied by the Twiddling factor; buffering data corresponding to the CP length beginning from a front of an output stream of the IFFT unit; and generating an OFDM symbol by forward-copying the buffered data to a back of the output stream of the IFFT unit.

According to another aspect of the present invention, there is provided an apparatus for modulating a symbol in a transmitter of an Orthogonal Frequency Division Multiplexing (OFDM) system. The symbol modulation method includes a Twiddling factor generator for generating a Twiddling factor used for circular-shifting frequency-domain data by a Cyclic Prefix (CP) length, the frequency-domain data undergoing Inverse Fast Fourier Transform (IFFT); a multiplier for multiplying the frequency-domain data by the Twiddling factor; an IFFT unit for performing IFFT on the frequency-domain data multiplied by the Twiddling factor; and a CP inserter for buffering the IFFT-transformed output stream beginning from a forefront thereof by a CP length, and adding the buffered stream to a back of the output stream.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

A transmitter of an OFDM system includes an OFDM symbol modulator for modulating bit data into an OFDM symbol. The OFDM symbol modulator inserts a CP for ISI prevention into an IFFT output, and buffers the IFFT output in the CP insertion process. The increase in the required buffer capacity and/or the delay occurring during CP insertion in the OFDM symbol modulator are caused by the samples of an IFFT output corresponding to the CP being output at the back of an $N_{FFT}$-symbol stream in terms of time. Therefore, the present invention provides a technology for allowing the samples corresponding to the CP to be output from the beginning of an $N_{FFT}$-symbol stream output from IFFT, thereby reducing the required buffer capacity and also preventing the delay occurring during CP insertion. In addition, the present invention provides a technology for performing bit-reversed (re)ordering for CP insertion at the front stage of IFFT in a parallel way, thereby further reducing the delay occurring during CP insertion.

For a better understanding of the present invention, a detailed description will now be made of (i) the type of an FFT algorithm applied to the general OFDM symbol modulator, (ii) the reasons why the delay occurs during CP insertion, and (iii) the reasons why more than two buffers are required for the general OFDM symbol modulator.

First, DFT and IDFT are defined by Equation (1) and Equation (2), respectively.

$$X(k)=\Sigma_{n=0}^{N-1}x(n)\exp(-j2\pi nk/N) \quad (1)$$

$$x(n) = \frac{1}{N}\sum_{k=0}^{N-1} X(k)\exp(j2\pi nk/N) \quad (2)$$

Actually, the DFT and IDFT are realized using an FFT algorithm to perform high-speed operations while reducing the hardware calculations. A size $N_{FFT}$ of the FFT is equal to the total number $N_s$ of subcarriers. The FFT algorithm can be classified into a Decimation-In-Frequency (DIF) scheme and Decimation-In-Time (DIT) scheme. During the actual hardware design of the FFT, to reduce the hardware complexity, it is preferable to use a Pipeline FFT rather than realizing the FFT in a parallel way according to a Signal Flow Graph (SFG) of the FFT. The Pipeline FFT is chiefly used for an application field requiring high performance. This is because the Pipeline FFT, compared to the FFT realized according to the SFG, has lower hardware complexity, has a regular FFT architecture, has simpler control, and enables serial input and serial output.

Figure 1:
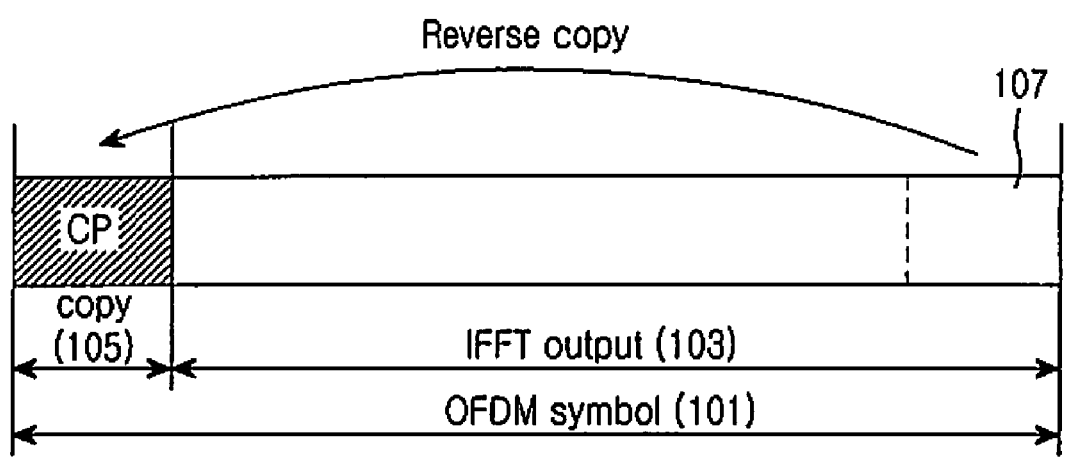
FIG. 1 illustrates reverse CP copying performed in a general OFDM system.

As shown in FIG. 1, for OFDM symbol modulation, the general OFDM/OFDMA scheme reverse-copies the back 107 of a total of $N_{FFT}$ samples output from IFFT back to the forefront (or head) of IFFT output 103, and attaches the copy to a guard interval 105. The CP copied to the guard interval 105 uses $N_{CP}$ samples in the backmost portion of the OFDM symbol 101.

Figure 2:
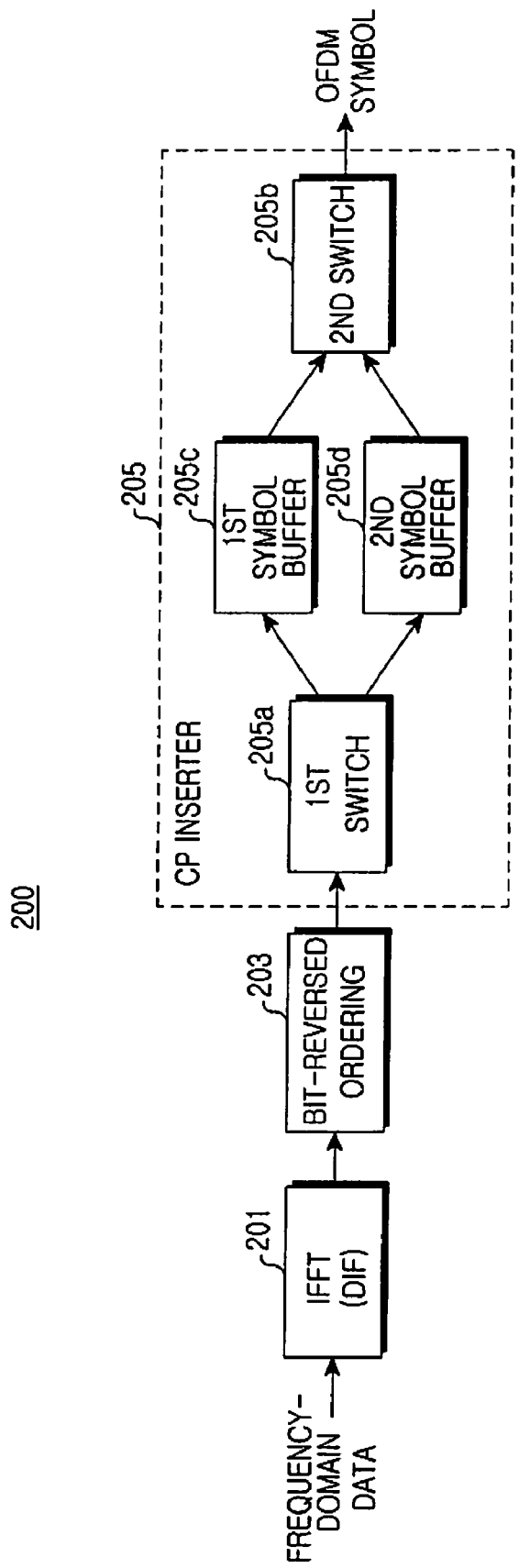
FIG. 2 illustrates a structure of a general OFDM symbol modulator.
Figure 3:
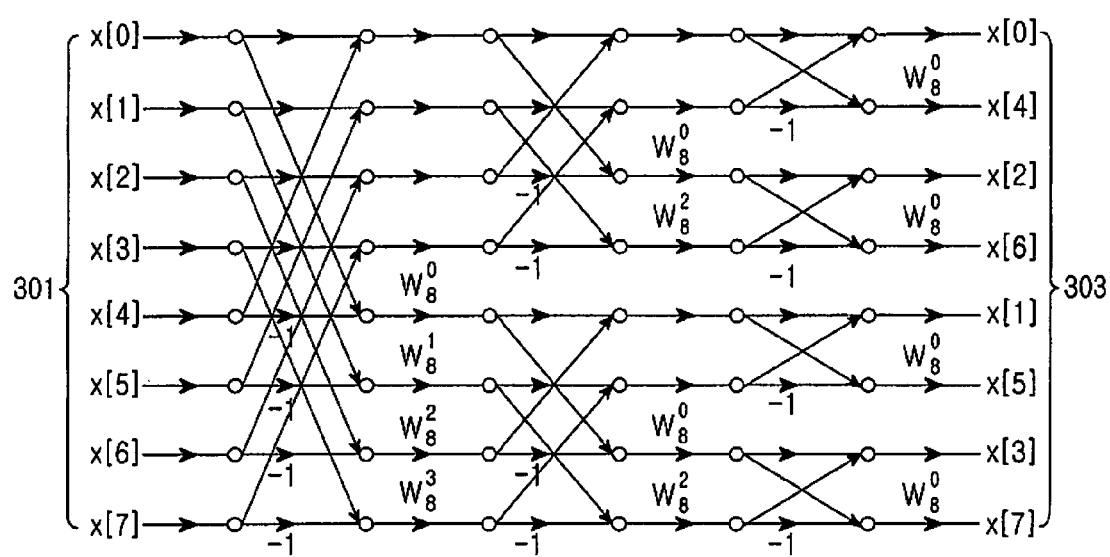
FIG. 3 illustrates a Signal Flow Graph (SFG) in a Decimation-In-Frequency (DIF) IFFT.
Figure 4:
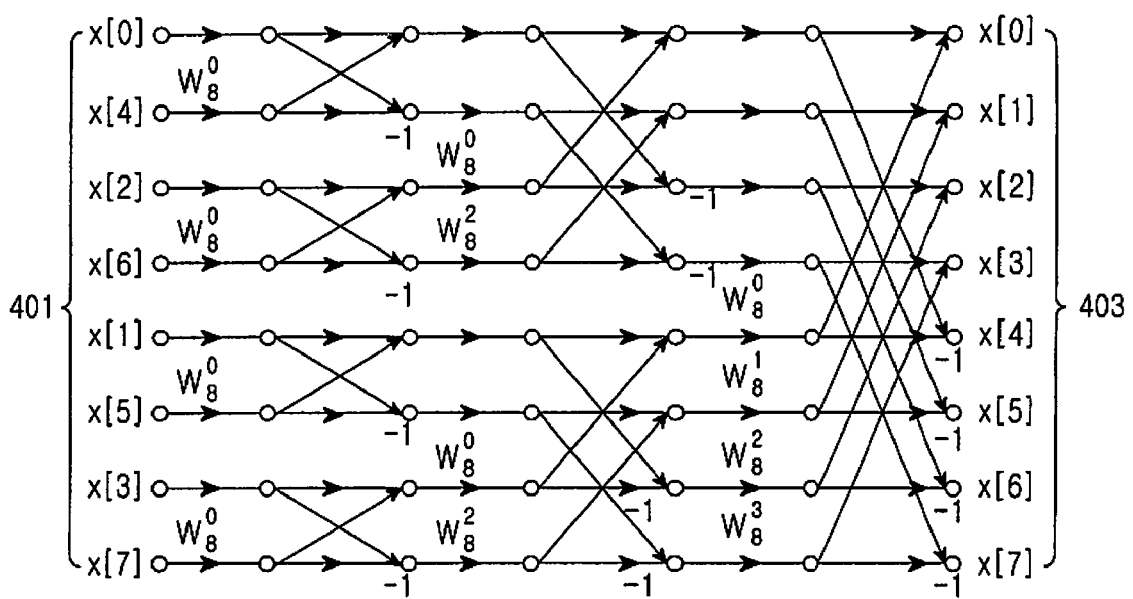
FIG. 4 illustrates an SFG in a DIT IFFT.

The general OFDM symbol modulator that uses the reverse copy scheme for CP insertion has the structure of FIG. 2. In the DIF scheme-based IFFT 201 (hereinafter referred to as 'DIF IFFT') shown in FIG. 2, while the input bits are ordered, the output bits are bit-reversed ordered. On the contrary, in the DIT scheme-based IFFT (hereinafter referred to as 'DIT IFFT'), while the input bits are bit-reversed ordered, the output bits are ordered. This is because of the butterfly structure of the IFFT. For example, when the total number of $N_{FFT}$ samples of the IFFT is 8, DIF SFG is as shown in FIG. 3 and DIT SFG is as shown in FIG. 4. In FIGS. 3 and 4, reference numerals 301 and 401 indicate inputs of DIF IFFT and DIT IFFT, respectively, and reference numerals 303 and 403 indicate outputs of DIF IFFT and DIT IFFT, respectively. It can be appreciated that for DIF IFFT, the output bits are bit-reversed ordered as shown in FIG. 3, and for DIT IFFT, the input bits are bit-reversed ordered as shown in FIG. 4. Therefore, the OFDM symbol modulator needs a bit-reversed ordering unit 203 for reordering the bit data bit-reversed ordered at one of input/output ends of IFFT as shown in FIG. 2. The 'bit-reversed ordering' refers to an operation in which when a number n is expressed in binary format, bits of the binary number are ordered in a reverse order as shown in Table 1. For example, for input bits '001', their bit-reversed ordered output bits are '100'.

TABLE 1

| Order (decimal) | Order (binary) | Bit reversed order (binary) | Bit reversed order (decimal) |
|---|---|---|---|
| 0 | 000 | 000 | 0 |
| 1 | 001 | 100 | 4 |
| 2 | 010 | 010 | 2 |
| 3 | 011 | 110 | 6 |
| 4 | 100 | 001 | 1 |
| 5 | 101 | 101 | 5 |
| 6 | 110 | 011 | 3 |
| 7 | 111 | 111 | 7 |

Turning back to the description of FIG. 2, because the inputs of DIF IFFT are allowed to be sequentially input to DIF IFFT but the outputs are output from DIF IFFT after undergoing bit-reversed ordering, there is a need for an IFFT output memory for bit reordering, and the output memory is prepared in the bit-reversed ordering unit 203. Similarly, because the inputs of DIT IFFT are input to DIT IFFT after undergoing bit-reversed ordering, there is a need for an IFFT input memory for bit-reversed ordering. To this end, a bit-reversed ordering unit (not shown) serving as the input memory is prepared in the front stage of the DIT IFFT.

A CP inserter 205 of FIG. 2, because it should reverse-copy $N_{CP}$ samples at the back of an IFFT output, needs at least two buffers (memories) having an OFDM symbol size. In the conventional scheme, to complete one OFDM symbol, a delay occurs until $N_{CP}$ samples are output at the back of an IFFT output, and a total of $N_{FFT}$ samples of the IFFT output are stored in a first symbol buffer 205c in the CP inserter 205. In terms of the delay, because for reverse copy, the CP inserter 205 cannot output data to the next block until the data of $N_{FFT}$ samples are input to the buffer, the time delay corresponding to the $N_{FFT}$ samples occurs.

Because the CP insertion process occurs every symbol interval, data input from the IFFT 201 and data output to a filter (not shown), or the next stage, should be simultaneously performed in the CP inserter 205. Therefore, the OFDM symbol modulator 200 of FIG. 2 needs at least two buffers having the size of the IFFT 201, such as the first symbol buffer 205c for receiving the data output from the IFFT 201 and a second symbol buffer 205d for outputting the data to the filter, and first and second switches 205a and 205b each switch inputs and outputs to/from the first and second symbol buffers 205c and 205d. That is, in the input/output scheme applied in FIG. 2, while the first symbol buffer 205c is filled up, data of the second symbol buffer 205d is output and switched by the first and second symbol buffers 205c and 205d in the next symbol interval.

As described above, the output end of DIF IFFT needs an operation of bit-reordering the output bit stream, and the input end of DIT IFFT needs an operation of bit-reordering the input bit stream. The two methods both need a buffer for bit reordering, and in terms of the delay, the OFDM symbol modulator cannot output the data to the next block until the data of $N_{FFT}$ IFFT samples is received, causing the time delay corresponding to the $N_{FFT}$ sample. As to the reason why the required buffer capacity and the delay happens, when the conventional CP insertion scheme is used, the samples corresponding to the CP are output at the back of an $N_{FFT}$-symbol stream in terms of time. Therefore, in order to add the CP, it is necessary to buffer the entire IFFT output stream, and further, it is necessary to copy samples corresponding to the CP in the entire IFFT output stream and reverse-add the copied samples. In addition, the bit-reversed ordering process is needed for the inputting/outputting of the IFFT, causing the time delay.

Therefore, proposed herein is a new scheme for allowing the value corresponding to the CP to be output beginning from the front of a total of $N_{FFT}$ samples during the output of the IFFT, thereby reducing the delay occurring during CP insertion and the required buffer capacity. If the bit-reversed ordering performed during the inputting/outputting of the IFFT is performed in parallel, the delay occurring during CP insertion and the required buffer capacity can be further reduced, and the hardware complexity can also be reduced.

With reference to FIGS. 5 to 13, a detailed description will now be made of embodiments of the present invention. The embodiments of the present invention will be described in light of 3 viewpoints.

After the basic concept of the present invention is first described with reference to FIG. 5, a first embodiment for forward-copying a CP for an output of the DIT IFFT to thereby reduce the required buffer capacity and the delay occurring during CP insertion will be described with reference to FIGS. 6 to 8. Thereafter, a second embodiment for parallel-performing not only the forward CP copying but also the bit-reversed ordering required at the input/output ends of the DIT IFFT to thereby further reduce the delay occurring during CP insertion and the required buffer capacity will be described with reference to FIGS. 9 to 11, and a third embodiment for performing forward CP copying on the output of the DIF IFFT to thereby reduce the required buffer capacity and the delay occurring during CP insertion will be described with reference to FIGS. 12 and 13.

Figure 5:
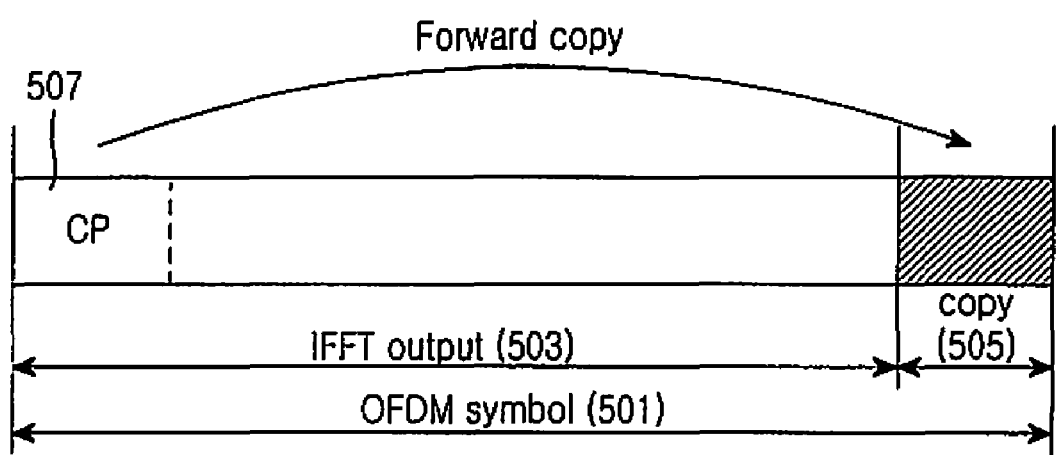
FIG. 5 illustrates the concept of forward CP copying according to an embodiment of the present invention.

FIG. 5 illustrates the concept of forward CP copying according to an embodiment of the present invention.

IFFT, a realization algorithm designed to quickly perform the IDFT calculation fast, follows all the basic characteristics of the IDFT. For example, the intact circular shift characteristic and periodicity of the IDFT can be applied even in the IFFT. The circular shift characteristic and periodicity of the IDFT are as follows. Equation (3) indicates the circular shift characteristic of the IDFT, and Equation (4) indicates the periodicity of the IDFT.

$$X[k]=X[k+N] \tag{3}$$

where N denotes the number of points of the IDFT.

$$y[n]=x[(n-m) \bmod N] \Leftrightarrow Y[k]=W_N^{-mk}X[k], m \in Z, 0 \leq n \leq N \tag{4}$$

where $W_N^n$ denotes a Twiddling factor for the DFT calculation, and $W_N^n = \exp(j2\pi n/N)$.

If the characteristics of Equation (3) and Equation (4) are applied to the IFFT-based OFDM modulation process, the result of Equation (5) can be derived.

If $F^{-1}(X[k]) = x[n]$, then  (5)

$$F^{-1}(W_{N_{FFT}}^{-kN_{CP}} * X[k]) = F^{-1}(\exp(j2\pi N_{CP}/N_{FFT}) * X[k])$$
$$= x[(n - N_{CP}) \bmod N_{FFT}]$$
$$= x[(n - N_{CP} + N_{FFT}) \bmod N_{FFT}]$$

where $F^1$ denotes the IFFT calculation, and k and n denote index values of an input stream and an output stream of the IFFT, respectively, and have an integer value between 0 to $N_{FFT}-1$. Further, $N_{CP}$ denotes a length of a CP sample, and $N_{FFT}$ denotes an FFT size and is equal to the number of subcarriers. When the IFFT is performed by multiplying the input stream of the IFFT by a Twiddling factor corresponding to the length of a CP sample, the output of the IFFT undergoes circular rotation (or circular shift). In addition, when a value $N_{CP}$ is applied to the circular shift as shown in Equation (5), it is possible to obtain the result that the part corresponding to the CP value is first output from the IFFT and the remaining values are output following the corresponding part. As a result, when compared to the conventional scheme, the CP that should be copied last is first output by circular shift. Therefore, with the use of Equation (5), it is possible to forward-copy the CP part from the front of an IFFT output as shown in FIG. 5.

In FIG. 5, an output 503 of the IFFT is assumed to be circular-shifted by a sample length $N_{CP}$ of a CP interval using the Twiddling factor. Under this assumption, the present invention first buffers the front of an OFDM symbol 501 where data of a CP interval 507 in the entire output 503 of the IFFT is located. Thereafter, if the output 503 of the IFFT is completed, the invention forward-copies the buffered data of the CP interval 507 and attaches it to the back 505 of the OFDM symbol.

By circular-rotating the IFFT output by the CP interval using the Twiddling factor and then forward-copying the result as described above, the new scheme can insert a CP into an OFDM symbol without buffering all samples of the IFFT output like that of the conventional scheme described in FIG. 1, thereby contributing to a reduction in the buffer capacity (or buffer size) required for the OFDM symbol modulator. In addition, the new scheme can perform CP insertion without waiting until all samples of IFFT are buffered like that of the conventional scheme, thereby contributing to a reduction in the delay occurring during CP insertion.

A detailed description will now be made of the first embodiment to the third embodiment of the present invention, all of which use the forward CP copying.

First Embodiment

Figure 6:
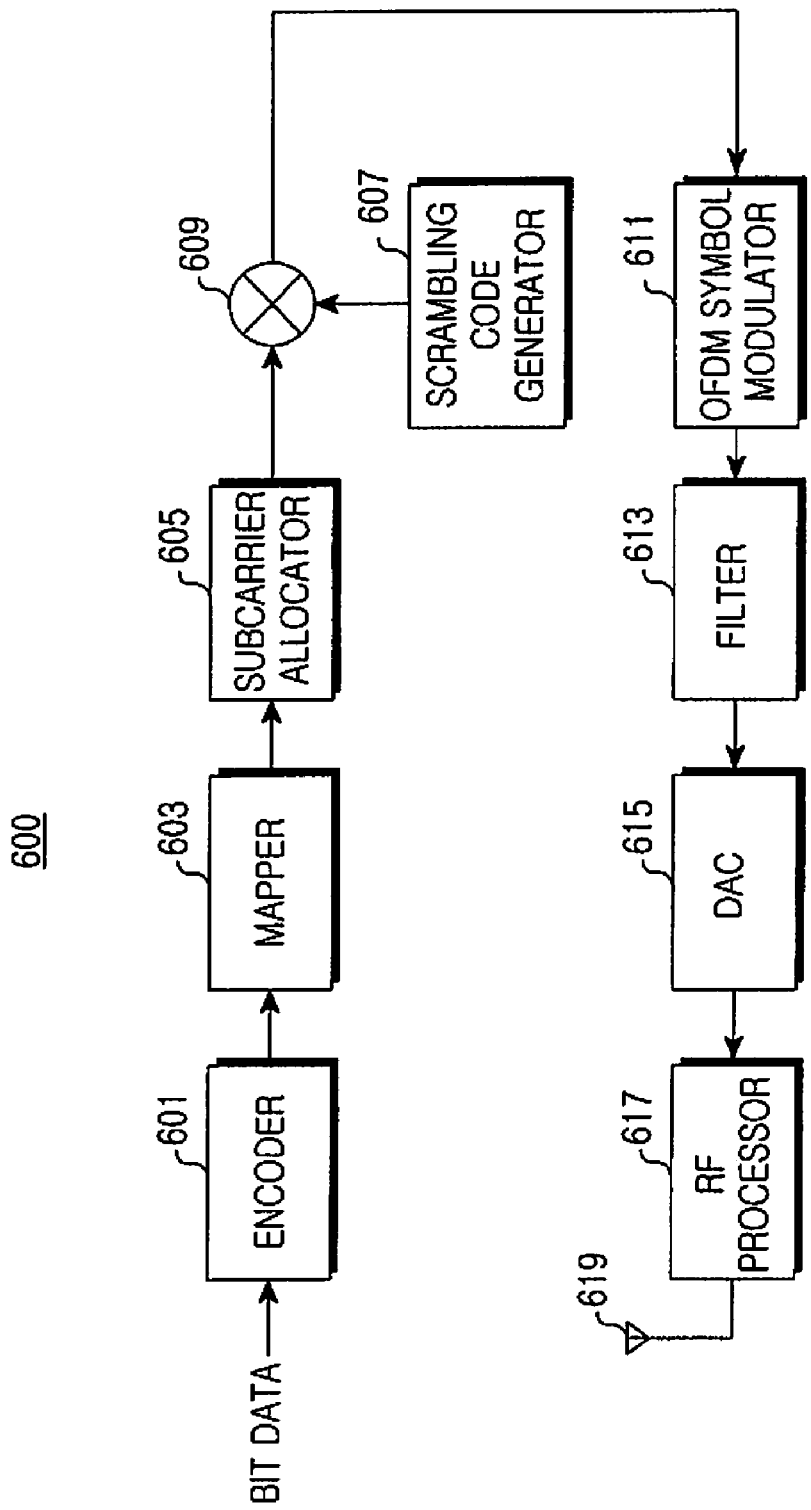
FIG. 6 illustrates a structure of a transmission apparatus in an OFDM system according to a first embodiment of the present invention.

FIG. 6 illustrates a structure of a transmission apparatus in an OFDM system according to the first embodiment of the present invention. A transmission apparatus 600 of FIG. 6 includes an encoder 601, a mapper 603, a subcarrier allocator 605, a scrambling code generator 607, a multiplier 609, an OFDM symbol modulator 611, a filter 613, a Digital-to-Analog Converter (DAC) 615, a Radio Frequency (RF) processor 617, and an antenna 619. Among the elements of FIG. 6, the remaining elements except for the OFDM symbol modulator 611 are equal to the corresponding elements of the general OFDM transmitter for encoding bit data, performing symbol mapping thereon, allocating subcarriers to the mapped data, spreading scrambling codes by multiplying, filtering an OFDM symbol, and transmitting it with a radio signal, so a detailed description thereof will be omitted herein. The OFDM symbol modulator 611 not only performs IFFT on the input data but also performs forward CP copying thereon according to the present invention in the CP insertion process.

Figure 7:
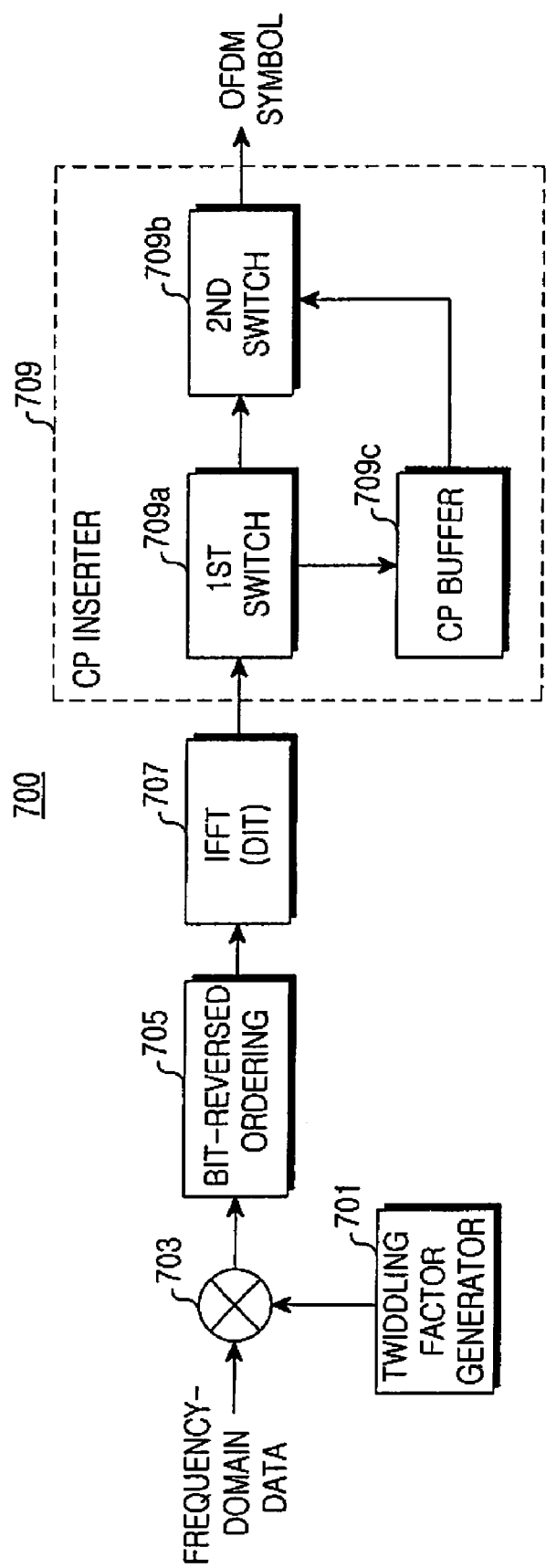
FIG. 7 illustrates a structure of an OFDM symbol modulation apparatus according to the first embodiment of the present invention.

FIG. 7 illustrates a structure of an OFDM symbol modulation apparatus according to the first embodiment of the present invention. The apparatus shown in FIG. 7 indicates the OFDM symbol modulator 611 of FIG. 6.

The apparatus of FIG. 7 is an embodiment using DIT IFFT 707, which performs forward CP copying in such a manner that input bits of the IFFT undergo bit-reversed ordering. In FIG. 7, a Twiddling factor generator 701 sequentially outputs Twiddling factors that should be multiplied by data X[k] in the frequency domain by a multiplier 703. According to the characteristics of the Twiddling factors, the number of Twiddling factors that should be generated depending on the value k of the input data X[k] is limited to, for example, $N_{FFT}/N_{CP}$ where $N_{FFT}$ denotes the total number (or length) of samples of an IFFT output, and $N_{CP}$ denotes the number (or length) of samples of a CP interval.

If indexes of the limited number of Twiddling factors are defined as a 'Twiddling factor number', the Twiddling factor multiplied by the input bits according to the Twiddling factor number is expressed as Equation (6).

Twiddling factor (Twiddling factor number)=exp(−j2π*Twiddling factor number*$N_{CP}/N_{FFT}$)  (6)

In addition, the Twiddling factor number according to the index k of the input data X[k] has a relationship of Equation (7).

Twiddling factor number(k)=(k mod($N_{FFT}/N_{CP}$)), k=0, 1,2,... $N_{FFT}-1$  (7)

For example, if a CP length is assumed to be ⅛ of the FFT size like in the WiMAX standard, the number of Twiddling factor numbers is limited to 8, and the Twiddling factors that should be multiplied according to the 8 Twiddling factor numbers are as shown in Table 2.

TABLE 2

| Index | Twiddling factor number | Twiddling factor |
|---|---|---|
| If(k mod 8) = 0 | 0 | 1 |
| If(k mod 8) = 1 | 1 | $\frac{1}{\sqrt{2}}(-1-i)$ |
| If(k mod 8) = 2 | 2 | −i |
| If(k mod 8) = 3 | 3 | $\frac{1}{\sqrt{2}}(1-i)$ |
| If(k mod 8) = 4 | 4 | −1 |
| If(k mod 8) = 5 | 5 | $\frac{1}{\sqrt{2}}(-1+i)$ |
| If(k mod 8) = 6 | 6 | i |
| If(k mod 8) = 7 | 7 | $\frac{1}{\sqrt{2}}(1+i)$ |

The Twiddling factor multiplied by an input stream to IFFT 707 in the multiplier 703 of FIG. 7 is set such that an output of IFFT 707 is circular-shifted by a length of a CP sample. A bit-reversed ordering unit 705 bit-reversed orders an IFFT input multiplied by the Twiddling factor, and the IFFT 707 performs IFFT according to the DIT scheme. Here, an IFFT output, compared to the general IFFT output, is the data circular-shifted by a sample length $N_{CP}$ of the CP interval.

A CP inserter 709 of FIG. 7 includes first and second switches 709a and 709b, and a CP buffer 709c. The first switch 709a performs switching so as to store the data of only the CP interval in the CP buffer 709c at the front of an IFFT output stream while outputting an IFFT output to the second switch 709b. The second switch 709b performs switching so as to output the IFFT output delivered from the first switch 709a to a filter (indicated by reference numeral 613 of FIG. 6), or the next stage, and after the output of IFFT 707 is completed in the corresponding block, outputs the data stored in the CP buffer 709c to the filter 613 following the corresponding output. The switching and buffering operation of the CP inserter 709 can be performed by an undepicted controller.

Figure 8:
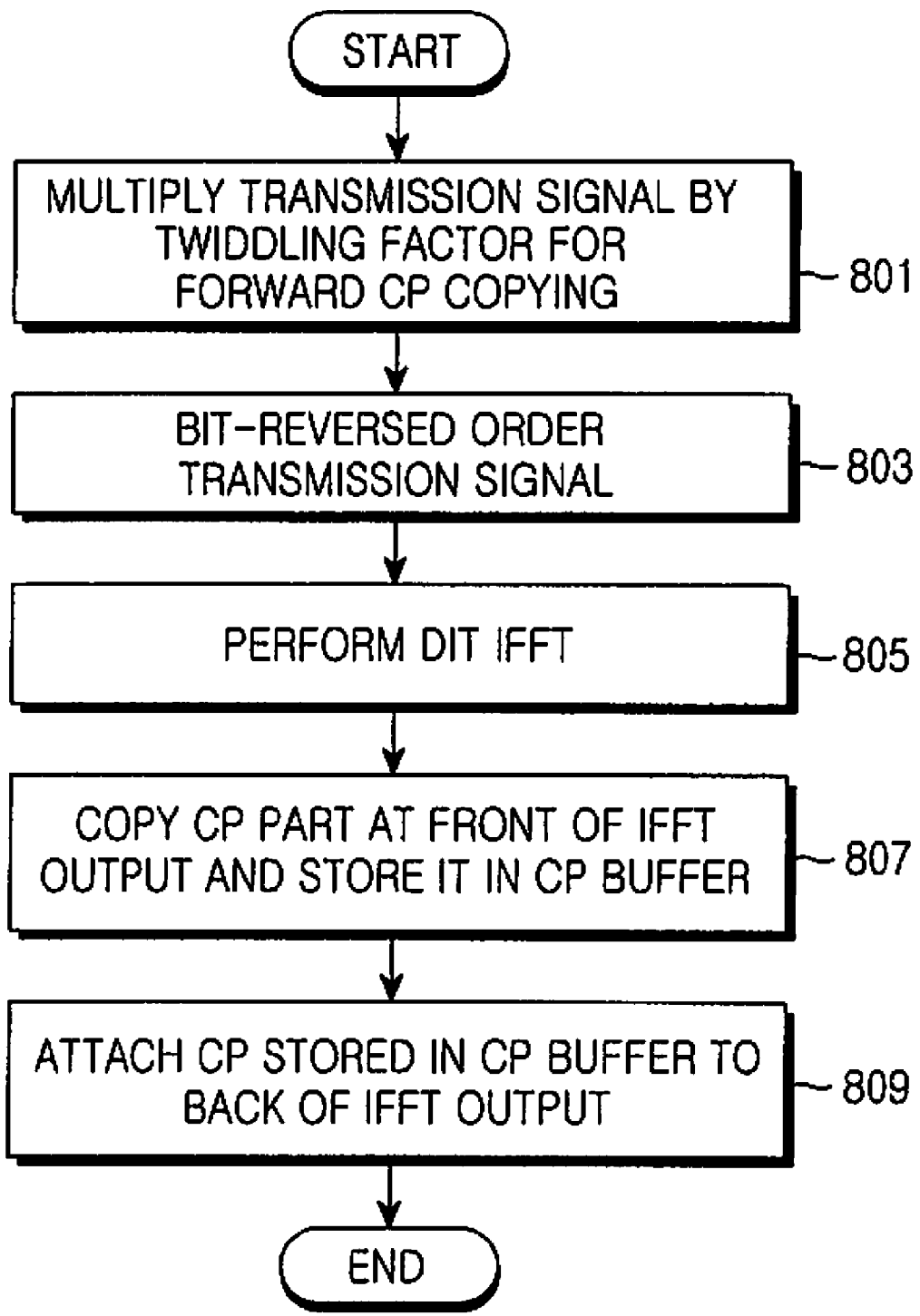
FIG. 8 illustrates an OFDM symbol modulation method according to the first embodiment of the present invention.

FIG. 8 illustrates an OFDM symbol modulation method according to the first embodiment of the present invention. The method of FIG. 8 will be described with reference to FIG. 7.

In step 801, a Twiddling factor generator 701 generates a Twiddling factor for forward CP copying, and multiplies the generated Twiddling factor by a transmission signal being input to an IFFT 707 by means of a multiplier 703. In step 803, a bit-reversed ordering unit 705 bit-reverse orders the transmission signal multiplied by the Twiddling factor, and outputs the resulting transmission signal to the IFFT 707. In step 805, the IFFT 707 performs the DIT IFFT on the bit-reversed ordered transmission signal, and outputs the IFFT data circular—shifted by a CP length. A CP inserter 709 buffers a CP part at the front of the IFFT output in step 807, and attaches the buffered CP part to the back of the IFFT output in step 809.

According to the first embodiment, the new scheme can insert a CP into an OFDM symbol without the need for buffering all of the samples of the IFFT output like that of the conventional scheme, and can also perform CP insertion without waiting until all samples of the IFFT are buffered.

When the DIT IFFT is used as described in the first embodiment, it is possible to parallel-perform the bit-reversed ordering and circular shift required in the IFFT input at the front stage of IFFT. In this case, the IFFT output can be used.

Next, the second embodiment will propose a scheme of performing bit-reversed ordering and circular shift for an IFFT input at the front stage of IFFT.

Second Embodiment

Figure 9:
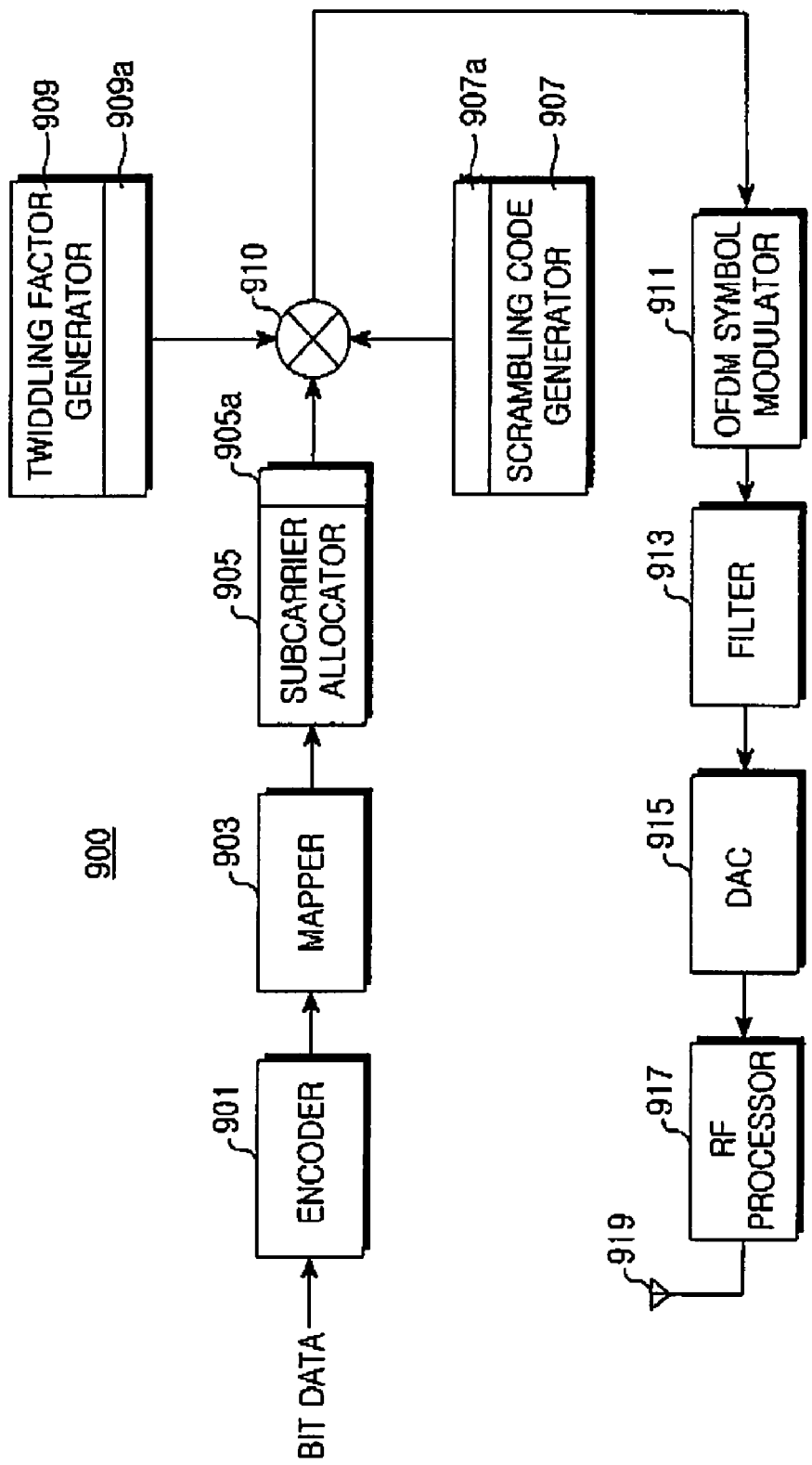
FIG. 9 illustrates a structure of a transmission apparatus in an OFDM system according to a second embodiment of the present invention.

FIG. 9 illustrates a structure of a transmission apparatus in an OFDM system according to the second embodiment of the present invention. A transmission apparatus 900 of FIG. 9 includes an encoder 901, a mapper 903, a subcarrier allocator 905, a scrambling code generator 907, a Twiddling factor generator 909, a multiplier 910, an OFDM symbol modulator 911, a filter 913, a DAC 915, an RF processor 917, and an antenna 919. In the transmission apparatus of FIG. 9, its basic operation of encoding bit data, performing symbol mapping thereon, allocating subcarriers to the mapped data, spreading scrambling codes by multiplying, filtering an OFDM symbol, and transmitting it with a radio signal is equal to the operation of the general OFDM transmitter, so a detailed description thereof will be omitted herein.

However, according to the present invention, the transmission apparatus of FIG. 9 includes, at the front stage of the OFDM symbol modulator 911, the Twiddling factor generator 909 for generating Twiddling factors for circular shift, and further includes bit-reversed ordering units 905a, 907a and 909a for bit-reversed ordering outputs of the subcarrier allocator 905, the scrambling code generator 907 and the Twiddling factor generator 909, respectively. Among the bit-reversed ordering units 905a, 907a and 909a, the bit-reversed ordering unit 907a included in the scrambling code generator 907 and the bit-reversed ordering unit 909a included in the Twiddling factor generator 909 may not be needed in the actual configuration, because the scrambling code generator 907 can be designed such that it generates scrambling codes to be multiplied by the bit-reversed ordered transmission signal during the generation of the scrambling codes. Similarly, the Twiddling factor generator 909 can also be configured such that it generates Twiddling factors to be multiplied by the bit-reversed ordered transmission signal during the generation of the Twiddling factors. The OFDM symbol modulator 911 performs the IFFT on the input data and also performs the forward CP copying on the input data in the CP insertion process according to the present invention.

By parallel-performing forward CP copying and bit-reversed ordering on the transmission signal being input to the IFFT at the front stage of the OFDM symbol modulator 911 according to the second embodiment of FIG. 2, the new scheme can further reduce the buffer capacity required in the OFDM symbol modulator 911 and the delay occurring during CP insertion.

In the general OFDM transmitter, because the element such as the subcarrier allocator 905 already has an internal buffer for performing its corresponding operation, the inclusion of the bit-reversed ordering unit 905a in FIG. 9 may not need a separate memory for bit-reversed ordering of the transmission signal, because the OFDM transmitter only needs to simply bit-reverse order an allocation address for the input data during subcarrier allocation. To this end, for subcarrier allocation, the subcarrier allocator 905 of FIG. 9 can use the allocation scheme in which bit-reversed ordering for input data has already been reflected. Equation (8) defines an allocation algorithm where the bit-reversed ordering for input data has already been reflected in the subcarrier allocator 905 of FIG. 9.

Allocated data $(k')$=bit reversed (Allocated data $(k)$),
$k$=0,1,2, ... ,$N_{FFT}$−1 where $k'$=bit reversed$(k)$,
$k'$=0,1,2, ... $N_{FFT}$−1                                    (8)

Similarly, the multiplier 910 where the Twiddling factors are multiplied can be designed using the existing multiplier (indicated by reference numeral 609 of FIG. 6) where the scrambling codes are multiplied.

In the second embodiment of FIG. 9, because the data bit-reversed ordered by the subcarrier allocator 905 is output, the scrambling code generator 907 and the Twiddling factor generator 909 also output the scrambling codes and the Twiddling factors, respectively, in which the bit-reversed ordering has already been reflected according to the following method.

The bit-reversed ordering method for the Twiddling factor will first be described.

While the Twiddling factor number based on the index k of the Twiddling factor can be expressed as Equation (7) in the first embodiment, the Twiddling factor number of the bit-reversed ordering-reflected Twiddling factor can be expressed as Equation (9) for the index k' of the bit-reversed ordered input data.

Twiddling factor number$(k')$=bit reversed(round$(k'/N_{CP})$) where $k'$=bit reversed$(k)$, $k'$=0,1,2, ...
,$N_{FFT}$−1                                    (9)

where 'round' refers to a rounding operator. The Twiddling factor determined according to the Twiddling factor number in Equation (9) is equal to that determined before the bit-reversed ordering is applied, and is determined as shown in Equation (6).

For example, if a ratio of $N_{FFT}$ to $N_{CP}$ is 8:1 like in the WiMAX standard, the Twiddling factors generated by the Twiddling factor generator 909 of FIG. 9 according to the index k' of the bit-reversed ordered input data are as shown in Table 3.

TABLE 3

| k' (bit reversed reordering index) | Twiddling factor number | Twiddling factor |
|---|---|---|
| $0 \sim N_{CP} - 1$ | 0 | 1 |
| $N_{CP} \sim 2 * N_{CP} - 1$ | 4 | −1 |
| $2 * N_{CP} \sim 3 * N_{CP} - 1$ | 2 | −i |
| $3 * N_{CP} \sim 4 * N_{CP} - 1$ | 6 | i |
| $4 * N_{CP} \sim 5 * N_{CP} - 1$ | 1 | $\frac{1}{\sqrt{2}}(-1-i)$ |
| $5 * N_{CP} \sim 6 * N_{CP} - 1$ | 5 | $\frac{1}{\sqrt{2}}(-1+i)$ |
| $6 * N_{CP} \sim 7 * N_{CP} - 1$ | 3 | $\frac{1}{\sqrt{2}}(1-i)$ |
| $7 * N_{CP} \sim 8 * N_{CP} - 1$ | 7 | $\frac{1}{\sqrt{2}}(1+i)$ |

The scrambling codes generated by the scrambling code generator 907 of FIG. 9 are also bit-reversed ordered and then multiplied by the bit-reversed ordered input data, and a description of the bit-reversed ordering method will be described below. The bit-reversed ordering method can previously generate scrambling codes according to the index k' of the bit-reversed ordered data using the corresponding scrambling seed, and store the generated scrambling codes in the memory for later use. That is, the bit-reversed ordering units 905a, 907a and 909a of FIG. 9 can be realized by means of the memories used by the subcarrier allocator 905, the scrambling code generator 907 and the Twiddling factor generator 909, respectively. As to the memory used by the scrambling code generator 907, it can be understood that because the scrambling code is 1-bit data, its required memory capacity is very low.

The scrambling codes are output in order of bit-reversed ordering made according to Equation (10).

Scrambling code(k')=bit reversed(scrambling code (scrambling seed,k)), k=0,1,2, ... $N_{FFT}$−1 where
k'=bit reversed(k), k'=0,1,2, ... ,$N_{FFT}$−1      (10)

Figure 10:
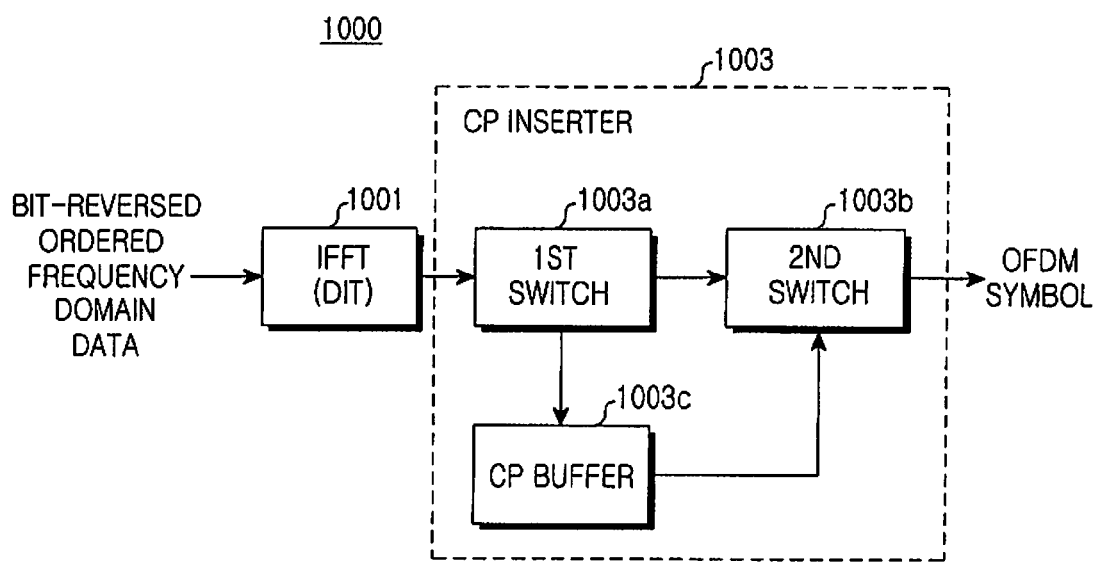
FIG. 10 illustrates a structure of an OFDM symbol modulation apparatus according to the second embodiment of the present invention.

FIG. 10 illustrates a structure of an OFDM symbol modulation apparatus according to the second embodiment of the present invention. The apparatus shown in FIG. 10 indicates the OFDM symbol modulator 911 of FIG. 9.

In the OFDM symbol modulation apparatus 1000 of FIG. 10, the input data is received after it underwent bit-reversed ordering in a parallel way at its front stage as described above. IFFT 1001 performs IFFT on the bit-reversed ordered input data according to the DIT scheme. The IFFT output, compared to the general IFFT output, is the data circular-shifted by a sample length $N_{CP}$ of a CP interval. A CP inserter 1003 of FIG. 10 includes first and second switches 1003a and 1003b, and a CP buffer 1003c, and its operation is equal to that of the CP inserter 709 of FIG. 7, so a detailed description thereof will be omitted.

Figure 11:
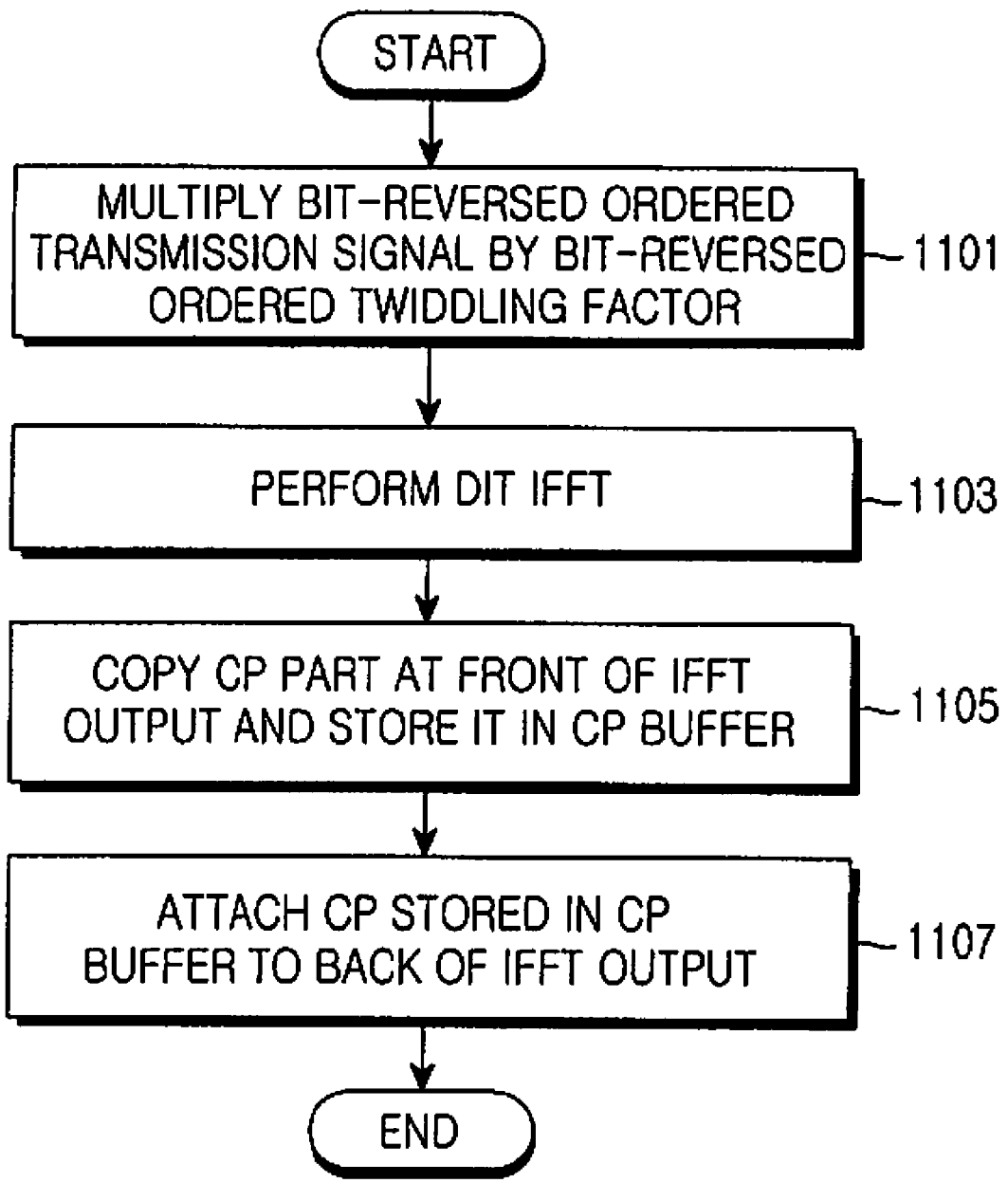
FIG. 11 illustrates an OFDM symbol modulation method according to the second embodiment of the present invention.

FIG. 11 illustrates an OFDM symbol modulation method according to the second embodiment of the present invention. The method of FIG. 11 will be described with reference to FIG. 10.

In step 1101, a front stage of IFFT 1001 multiplies the bit-reversed ordered input transmission signal by a Twiddling factor for forward CP copying. Thereafter, in step 1103, the IFFT 1001 performs the DIT IFFT on the bit-reversed ordered transmission signal, and outputs the IFFT data circular-shifted by a CP length. A CP inserter 1003 buffers a CP part at the front of the IFFT output in step 1105, and attaches the buffered CP part to the back of the IFFT output in step 1107.

According to the second embodiment, the new scheme can insert a CP into an OFDM symbol without the need of buffering all of the samples of the IFFT output like that of the conventional scheme, and can also perform CP insertion without waiting until all of the samples of the IFFT are buffered. In addition, the new scheme can perform bit-reversed ordering and circular shift on the IFFT input at the front stage of the IFFT, contributing to a further reduction in the required buffer capacity and the delay.

Although the foregoing description of the first embodiment and the second embodiment is directed to the case where the present invention is applied to the DIT IFFT, the third embodiment will propose a scheme of performing forward CP copying for the DIF IFFT, thereby contributing to a reduction in the required buffer capacity and the delay during CP insertion.

Third Embodiment

Figure 12:
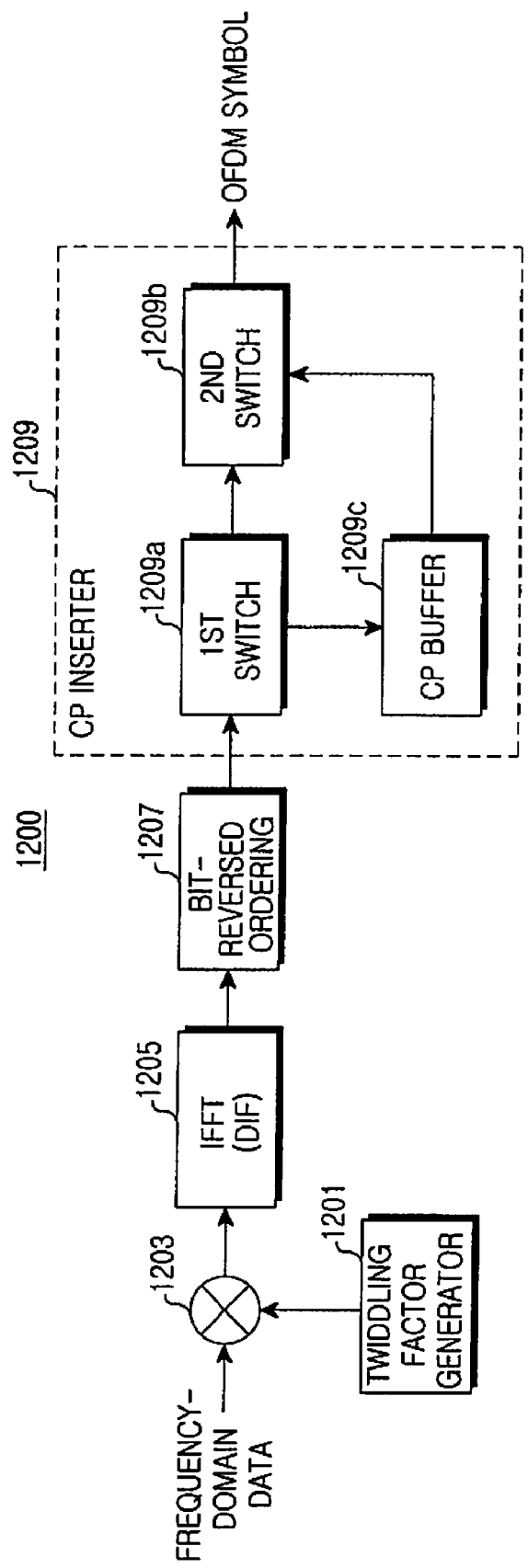
FIG. 12 illustrates a structure of an OFDM symbol modulation apparatus according to a third embodiment of the present invention.

In the third embodiment, the OFDM transmission apparatus can use the intact structure of FIG. 9 described in the first embodiment, after simply modifying only the structure of the OFDM symbol modulator as shown in FIG. 12.

FIG. 12 illustrates a structure of an OFDM symbol modulation apparatus according to the third embodiment of the present invention.

In the OFDM symbol modulation apparatus 1200 of FIG. 12, a Twiddling factor generator 1201 sequentially outputs Twiddling factors that should be multiplied by the frequency-domain data by means of a multiplier 1203. Here, the Twiddling factors are generated in the manner described in the first embodiment. The Twiddling factor multiplied by the input stream of IFFT 1205 is set such that the output of IFFT 1205 is circular-shifted by a length of a CP sample. However, while the first embodiment bit-reversed orders an input of the IFFT using the DIT IFFT, the third embodiment uses the DIF IFFT for the bit-reversed ordering, so the input of the IFFT is directly input to the IFFT 1205 without undergoing the bit-reversed ordering process.

In FIG. 12, the IFFT 1205 performs the IFFT according to the DIF scheme. Here, the IFFT output, compared to the general IFFT output, is the data circular-shifted by a sample length $N_{CP}$ of a CP interval. A bit-reversed ordering unit 1207 bit-reversed orders the circular-shifted IFFT output. A CP inserter 1209 of FIG. 12 includes first and second switches 1209a and 1209b, and a CP buffer 1209c, and its operation is equal to that of the CP inserter 709 of FIG. 7, so a detailed description thereof will be omitted.

Figure 13:
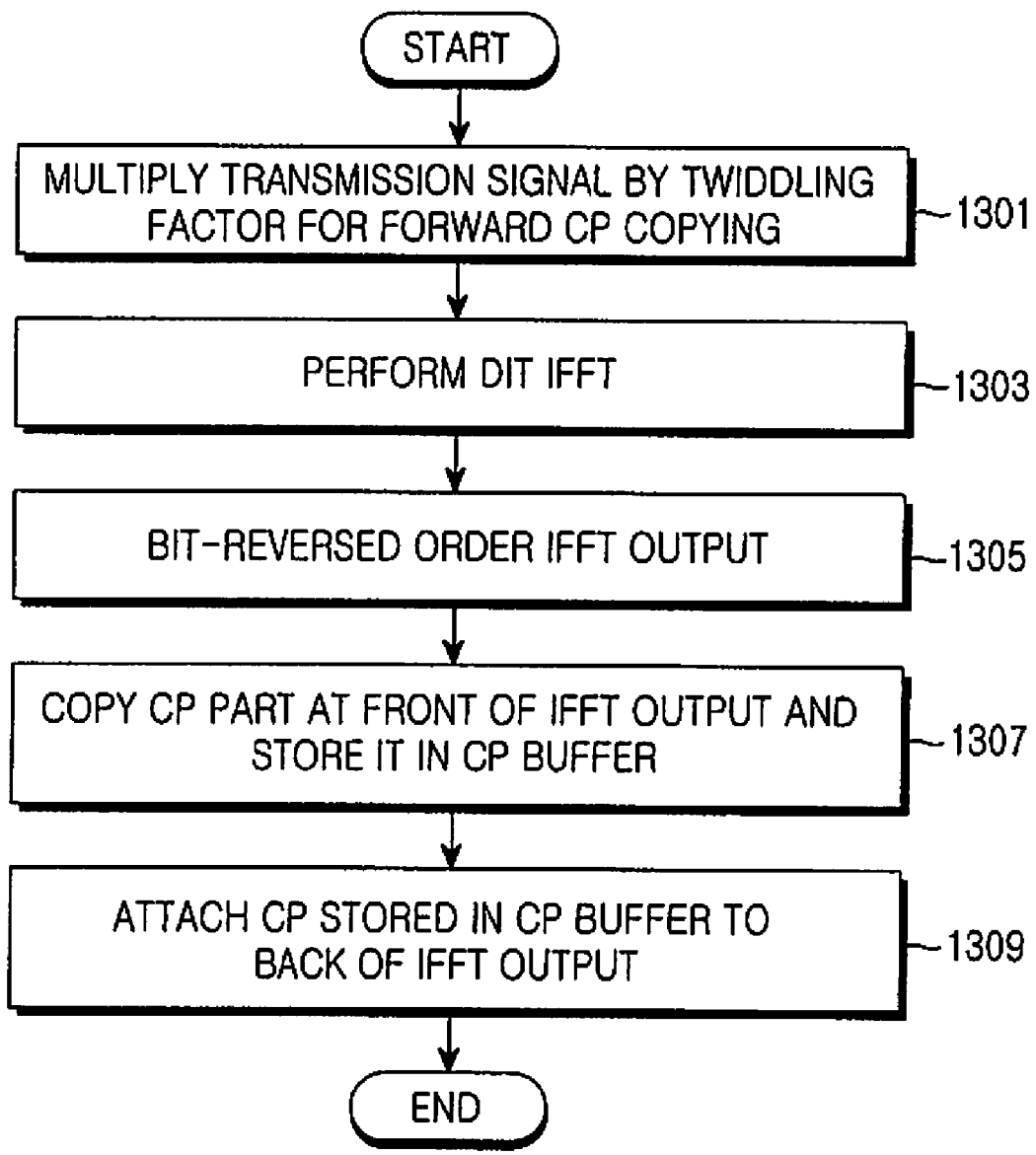
FIG. 13 illustrates an OFDM symbol modulation method according to the third embodiment of the present invention.

FIG. 13 illustrates an OFDM symbol modulation method according to the third embodiment of the present invention. The method of FIG. 13 will be described with reference to FIG. 12.

In step 1301, a Twiddling factor generator 1201 generates a Twiddling factor for forward CP copying, and multiplies the generated Twiddling factor by a transmission signal being input to IFFT 1205 by means of a multiplier 1203. In step 1303, the IFFT 1205 performs the DIF IFFT, and outputs the IFFT data circular-shifted by a CP length. In step 1305, a bit-reversed ordering unit 1207 bit-reversed orders the circular-shifted IFFT output, and outputs the result to a CP inserter 1209. As for the DIF IFFT, its output undergoes bit-reversed ordering before being output. Therefore, if the bit-reversed ordering unit 1207 performs bit-reversed ordering in step 1305, the IFFT output is reordered in its original bit order. Thereafter, the CP inserter 1209 buffers a CP part at the front of an IFFT output in step 1307, and attaches the buffered CP part to the back of the IFFT output in step 1309.

According to the first embodiment to the third embodiment of the present invention, because the value corresponding to a CP in an IFFT output is output from the beginning, the new scheme can immediately forward the value output from the IFFT to the next stage without the need to store all of the samples of an OFDM symbol in the buffer. Therefore, the new scheme, compared to the conventional OFDM symbol modulation scheme, can reduce the delay by an $N_{FFT}$-sample length. In addition, the conventional scheme, as it should store the entire OFDM symbol, uses at least two $N_{FFT}$-size buffers for the CP inserter, whereas the new OFDM symbol modulation scheme proposed by the present invention can reduce the required buffer capacity because the CP inserter uses only one CP-size buffer as the new scheme needs only to store in the CP buffer the value corresponding to the first CP interval in the IFFT output.

For example, assuming that 1024-point FFT and a 128-sample CP are used and the number of IFFT input/output bits is 16 for each of the I and Q channels, the buffer reduction ratio required for the OFDM symbol modulator is as follows:
Conventional IFFT Output Buffer Decrement=1024 samples*32 bits*2=65536 bits
CP Buffer Increment=128 samples*32 bits*1=4096 bits
Scrambler Buffer Increment=1024 samples*1 bit*1=1024 bits
Buffer (Memory) Decrement Ratio=(4096+1024−65536)/ 65536=92% Decrement As a result, the proposed scheme, compared to the conventional scheme, can reduce about 92% of the required buffer capacity.

As is apparent from the foregoing description, the present invention can reduce the delay and the required buffer capacity occurring in the OFDM transmitter that performs CP insertion in the OFDM symbol modulation process, thereby contributing to improvement of the performance of the OFDM transmitter. In addition, the present invention can reduce the data transmission preparation time at the OFDM transmitter, thus contributing to an increase in the timing margin and a decrease in the hardware complexity of the transmitter.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for modulating a symbol in a transmitter of an Orthogonal Frequency Division Multiplexing (OFDM) system, the method comprising:
multiplying an input stream of an Inverse Fast Fourier Transform (IFFT) unit by a Twiddling factor for circular-shifting the input stream of the IFFT unit by a Cyclic Prefix (CP) length;
performing IFFT on the input stream of the IFFT unit, which is multiplied by the Twiddling factor;
buffering data corresponding to the CP length beginning from a front of an output stream of the IFFT unit; and
generating an OFDM symbol by forward-copying the buffered data to a back of the output stream of the IFFT unit.

2. The method of claim 1, wherein the buffering of the data corresponding to the CP length and the outputting of the IFFT unit are simultaneously performed.

3. The method of claim 1, further comprising:
when the IFFT unit uses a Decimation-In-Time (DIT) scheme, bit-reversed ordering the input stream of the IFFT unit and inputting the result to the IFFT unit.

4. The method of claim 3, wherein the Twiddling factor, together with a scrambling code, is multiplied by a transmission signal.

5. The method of claim 4, wherein the scrambling code is circular-shifted depending on the Twiddling factor.

6. The method of claim 1, further comprising:
when the IFFT unit uses a Decimation-In-Frequency (DIF) scheme, bit-reversed ordering the output stream of the IFFT unit.

7. An apparatus for modulating a symbol in a transmitter of an Orthogonal Frequency Division Multiplexing (OFDM) system, the method comprising:
a Twiddling factor generator for generating a Twiddling factor used for circular-shifting frequency-domain data by a Cyclic Prefix (CP) length, the frequency-domain data undergoing an Inverse Fast Fourier Transform (IFFT);
a multiplier for multiplying the frequency-domain data by the Twiddling factor;
an IFFT unit for performing IFFT on the frequency-domain data multiplied by the Twiddling factor; and
a CP inserter for buffering the IFFT-transformed output stream beginning from a forefront thereof by a CP length, and adding the buffered stream to a back of the output stream.

8. The apparatus of claim 7, wherein the CP inserter comprises:
a buffer for buffering based on the CP length;
a first switch for receiving a first stream from the IFFT-transformed output stream, and outputting the output stream to the buffer beginning from a forefront thereof by the CP length; and
a second switch for adding the stream stored in the buffer to a back of the IFFT-transformed output stream.

9. The apparatus of claim 7, further comprising:
a bit-reversed ordering unit for bit-reversed ordering an input stream of the IFFT unit and outputting the result to the IFFT unit when the IFFT unit uses a Decimation-In-Time (DIT) scheme.

10. The apparatus of claim 9, wherein when the IFFT unit uses the DIT scheme, the Twiddling factor generator generates a Twiddling factor for circular-shifting the bit-reversed ordered frequency-domain data by the CP length, the bit-reversed ordered frequency-domain data undergoing IFFT.

11. The apparatus of claim 10, further comprising:
a scrambling code generator for generating a scrambling code used for spreading the bit-reversed ordered frequency-domain data.

12. The apparatus of claim 11, wherein the multiplier multiples the bit-reversed ordered frequency-domain data by the scrambling code and the Twiddling factor.

13. The apparatus of claim 10, further comprising:
a scrambling code generator for generating a scrambling code used for spreading the frequency-domain data; and
a scrambling code bit-reversed ordering unit for spreading the bit-reversed ordered frequency-domain data with the scrambling code.

14. The apparatus of claim 7, further comprising:
a bit-reversed ordering unit for bit-reversed ordering an output stream of the IFFT unit when the IFFT unit uses a Decimation-In-Frequency (DIF) scheme.

* * * * *